United States Patent
Nam et al.

(10) Patent No.: US 8,636,947 B2
(45) Date of Patent: Jan. 28, 2014

(54) METAL SEPARATOR FOR FUEL CELL AND SURFACE TREATMENT METHOD THEREOF

(75) Inventors: Young Min Nam, Siheung (KR); Yoo Chang Yang, Gunpo (KR); Suk Min Baeck, Anyang (KR); Seung Gyun Ahn, Suwon (KR)

(73) Assignee: Hyundai Motor Company, Seoul (KR)

( * ) Notice: Subject to any disclaimer, the term of this patent is extended or adjusted under 35 U.S.C. 154(b) by 490 days.

(21) Appl. No.: 12/951,888

(22) Filed: Nov. 22, 2010

(65) Prior Publication Data

US 2012/0088184 A1   Apr. 12, 2012

(30) Foreign Application Priority Data

Oct. 11, 2010 (KR) .......................... 10-2010-0098887

(51) Int. Cl.
*B22F 7/04* (2006.01)
*B22F 3/24* (2006.01)

(52) U.S. Cl.
USPC ............... 419/12; 419/26; 419/45; 419/46; 148/210; 148/238

(58) Field of Classification Search
USPC .............. 75/228–250, 255, 252, 253, 254; 148/206–238, 240–287, 513, 514, 148/516–537; 429/411, 457, 512–535, 429/129–147, 246–255
See application file for complete search history.

(56) References Cited

U.S. PATENT DOCUMENTS

2003/0231973 A1 * 12/2003 Krumpelt et al. ................. 419/8

FOREIGN PATENT DOCUMENTS

| JP | 2004-039516 | 2/2004 | |
|----|----|----|----|
| JP | 2004-039516 A * | 2/2004 | ............ H01M 8/02 |
| JP | 2005-089800 | 4/2005 | |
| KR | 1020070099517 | 10/2007 | |
| KR | 100801429 | 1/2008 | |

OTHER PUBLICATIONS

Computer-generated translation of JP 2004-039516, published on Feb. 5, 2004 in the Japanese language.*
Title page of KR1997-0043267 (Jong-Dae Im), published Jul. 26, 1997 in the Korean language.*
Professional translation of JP 2004-039516, published originally on Feb. 5, 2004 in the Japanese language.*
Professional translation of parts of KR1997-0043267 (Jong-Dae Im), published originally on Jul. 26, 1997 in the Korean language.*

* cited by examiner

*Primary Examiner* — Scott Kastler
*Assistant Examiner* — Vanessa Luk
(74) *Attorney, Agent, or Firm* — Edwards Wildman Palmer LLP; Peter F. Corless

(57) ABSTRACT

The present invention provides an improved metal separator for a fuel cell and a method for preparing same. More particularly, the invention provides a metal separator for a fuel cell, whereby the separator has a surface structure that imparts reduced contact resistance, improved corrosion resistance, and stable electrical conductivity. The invention further provides a surface treatment method for making the metal separator of the invention. The inventive method comprises sintering Fe—Cr—B—V-based powder on the surface of a metal foam to form an alloy layer; and forming a nitride layer of a (Cr—V—B)N-based material while supplying nitrogen gas on the surface of the alloy layer.

7 Claims, 4 Drawing Sheets though corrosion resistance is improved where a thick oxide layer is formed on the surface, the surface contact resistance at the same time rises rapidly, making the treated metal inoperable as a separator for use in a fuel cell.

METAL SEPARATOR FOR FUEL CELL AND SURFACE TREATMENT METHOD THEREOF

CROSS-REFERENCE TO RELATED APPLICATIONS

This application claims priority under 35 U.S.C. §119 to Korean Patent Application No. 10-2010-0098887, filed on Oct. 11, 2010, in the Korean Intellectual Property Office, the disclosure of which is incorporated herein by reference in its entirety.

BACKGROUND (a) Technical Field

The present invention relates to a metal separator for a fuel cell and to a method of treating the surface of the metal separator to form same. More particularly, the present invention relates to a metal separator for a fuel cell whereby the surface of the metal separator is treated to have improved corrosion-resistance, reduced contact resistance and improved electrical conductivity as compared to a conventional fuel cell metal separator.

(b) Background Art

In the area of fuel cell technology, a current aim is to develop a metal separator for use in a fuel cell which can replace existing graphite separators and which has a surface structure that is capable of overcoming the poor corrosion resistance typically seen with existing metal separators, as well as displaying improved stable electrical conductivity and other improved properties. Fuel cell stack separators account for more than 50% of their overall cost. Metal separators will help reduce these costs, however, certain hurdles as to their use must first be overcome.

To date, a variety of metal materials, including steel, stainless steel, and aluminum, etc., have been studied for their application as fuel cell separators. Among them, stainless steel is typically used most often as a metal separator for fuel cells.

Conducting the proper surface treatment of a metal separator for a fuel cell is important in determining the overall characteristics of the separator. Various methods for carrying out surface treatments of a metal separator are known. For example, physical vapor deposition processes whereby the surface is coated with carbide or nitride to form a hardened coating layer (e.g., CrN or TiN coating layer) can be used. Also, surfaces can be treated by a plasma nitriding process (i.e., a heat treating process that alloys nitrogen onto the surface of a metal to create a hardened surface) by which a nitride layer is formed on the surface of a metal using a plasma deposition process that can be operated at a temperature lower than 600° C.

The high-quality coating layers, such as CrN or TiN, produced by physical vapor deposition processes usually provide superior corrosion resistance which satisfies the requisite level of corrosion resistance of a fuel cell separator. However, such methods produce surfaces having relatively high contact resistance, and also have high production costs due to the high vacuum conditions. Accordingly, such methods are impractical with regard to mass production of such materials.

Problems are also associated with preparing such materials by plasma nitriding. While a surface nitride layer produced by plasma nitriding provides good cost competitiveness and mass producibility, such processes, through interdiffusion of chromium and nitrogen, result in extensive pore formation near the surface of the material. In addition, nitride is formed from bonding with the bulk chromium. As a result, a large amount of chromium is consumed in the process, which results in the formation of a chromium-deficient layer, thereby greatly decreasing corrosion resistance of the material.

Thus, oxidation and corrosion may occur at the surface of such materials if prepared using the above existing techniques. Moreover, although corrosion resistance is improved where a thick oxide layer is formed on the surface, the surface contact resistance at the same time rises rapidly, making the treated metal inoperable as a separator for use in a fuel cell.

To solve these problems, research has focused on developing materials for forming fuel cell separators that contain lower amounts of chromium, e.g., 25%. However, while corrosion resistance may be improved with less chromium, processability is degraded if the chromium content exceeds 20%. Thus, it is difficult to form flow channels for hydrogen, oxygen, water, etc. with desired shape through press processing because of excessive springback. Improved materials and methods which can be used to produce viable metal separators for fuel cells as realistic substitutes for graphite separators would be an advance in the art.

The above information disclosed in this Background section is only for enhancement of understanding of the background of the invention. Therefore the above may contain information that does not form the prior art that is already known in this country to a person of ordinary skill in the art.

SUMMARY

The present invention provides an improved metal separator for a fuel cell that advantageously is corrosion-resistant, has relatively low contact resistance and provides stable electrical conductivity, in contrast to metal separators prepared by the processes known in the art. The invention further provides a method for forming the metal separator of the invention, in particular, a method to prepare or treat the metal surface of the separator to impart the aforementioned properties and advantages.

In one general aspect, the present disclosure provides a method for surface treatment of a metal separator for a fuel cell, including the steps of: sintering Fe—Cr—B—V-based powder on the surface of a metal foam to form an alloy layer; and forming onto the alloy layer a nitride layer of a (Cr—V—B)N-based material while supplying nitrogen gas on the surface of the alloy layer.

In certain embodiments, the nitrogen gas may be supplied when necking occurs between the metal foam and the Fe—Cr—B—V-based powder during the sintering in order to form a uniform nitride layer on the surface of the alloy layer.

In other embodiments, the Fe—Cr—B—V-based powder may be an alloy powder containing 50 to 70 wt % of iron (Fe), 25 to 40 wt % of chromium (Cr), 2 to 5 wt % of boron (B) and 4 to 8 wt % of vanadium (V).

In still other embodiments, the Fe—Cr—B—V-based powder may have an average diameter particle size of 20 to 50 μm.

In yet other embodiments, the nitride layer may include a CrN layer and a (B—V)N layer physically mixed with the CrN layer, with at least part of the (B—V)N layer being exposed on the surface, wherein the CrN layer contains 60 to 80 wt % of CrN and 20 to 40 wt % of $Cr_2N$ and has a thickness of 1 to 1.5 μm.

In another embodiment, the (B—V)N layer may be formed of boron (B) doped in vanadium nitride (VN).

The metal foam may be made of iron and may have a porosity of 80 to 93%, a pore diameter of 50 to 450 μm and a thickness of 0.2 to 0.4 mm.

In another general aspect, the present disclosure provides a metal separator for use in a fuel cell which is formed by the method of surface treatment of the invention.

In one embodiment, the surface treatment method of the invention for preparing a metal separator for a fuel cell is capable of satisfying the contact resistance requirement of a separator of a fuel cell while providing improved corrosion property. Further, the method is applicable to mass production since it requires no modification of the existing sintering furnace and no additional processing or coating processes. Further still, the method allows more than 60% of cost reduction as compared to the conventional coated stainless steel.

In addition, the method of the invention can be applied to a metal having any shape or thickness. With satisfactory corrosion resistance and contact resistance, the alloy powder used in the present invention enables an improvement in the output of a fuel cell system. Further, product quality is ensured because defects formed during the coating process are minimized or eliminated.

The above and other features and advantages of the present invention will be apparent from or are set forth in more detail in the accompanying drawings, which are incorporated in and form a part of this specification, and the following Detailed Description, which together serve to explain by way of example the principles of the present invention.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other objects, features and advantages of the present disclosure will now be described in detail with reference to certain exemplary embodiments thereof illustrated in the accompanying drawings which are given hereinbelow by way of illustration only, and thus are not limitative of the disclosure, and wherein.

Figure 1:
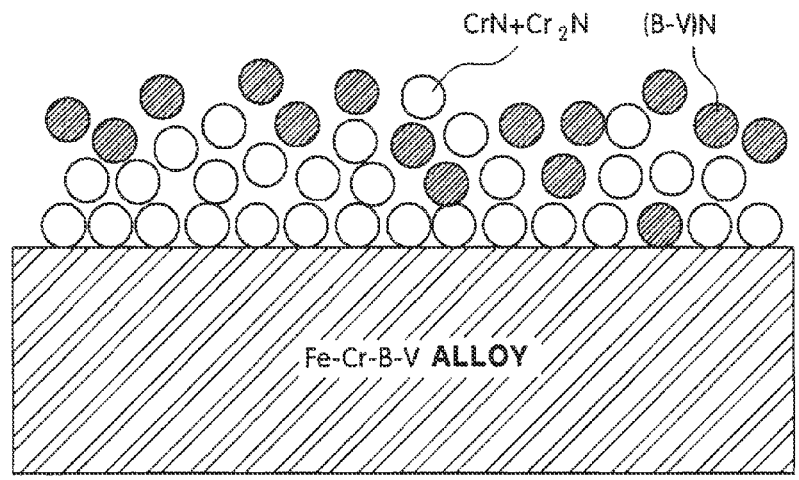
FIG. 1 illustrates a surface structure of a metal separator for a fuel cell according to the present invention.
Figure 2:
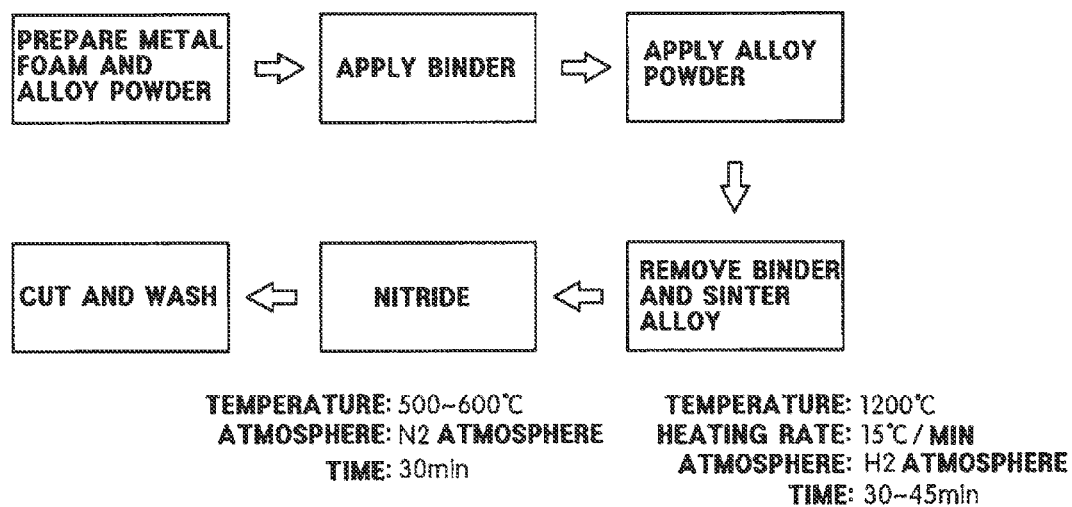
FIG. 2 is a flow chart illustrating a surface treatment process of a metal separator for a fuel cell according to the present invention.

It should be understood that the appended drawings are not necessarily to scale, presenting a somewhat simplified representation of various preferred features illustrative of the basic principles of the disclosure. The specific design features of the disclosure as disclosed herein, including, for example, specific dimensions, orientations, locations and shapes, will be determined in part by the particular intended application and use environment.

DETAILED DESCRIPTION OF PREFERRED EMBODIMENTS

Hereinafter, reference will now be made in detail to various embodiments of the present invention, examples of which are illustrated in the accompanying drawings and described below. While the disclosure will be described in conjunction with exemplary embodiments, it will be understood that the present description is not intended to limit the disclosure to those exemplary embodiments. To the contrary, the disclosure is intended to cover not only the exemplary embodiments, but also various alternatives, modifications, equivalents and other embodiments, which may be included within the spirit and scope of the disclosure as defined by the appended claims.

The terminology used in the present disclosure is for illustrative purpose only and is not intended to limit the present disclosure. In the following description, details of the parts common to the known art may be omitted.

In one aspect, the present invention provides a metal separator for a fuel cell that is capable of replacing a graphite separator, which accounts for more than 50% of a fuel cell stack price. The present invention provides an improved metal separator for a fuel cell that advantageously is corrosion-resistant, has relatively low contact resistance and provides stable electrical conductivity, as compared to a metal separator prepared by conventional methods. In another aspect, the invention provides a method for forming the metal separator of the invention, in particular, a method for treating the surface of the metal separator to impart the aforementioned advantages, whereby the surface treatment method comprises depositing a nitride layer over the surface of the metal separator. The inventive method can be conducted on a metal separator regardless of its shape or thickness.

In one embodiment, the surface treatment method of the invention first involves preparing a metal foam and an alloy powder (e.g., Fe—Cr—B—V-based powder), followed by applying a binder to the surface of the metal foam.

The metal foam can be an inexpensive metal foam comprising iron (Fe). Other known metal foams are also contemplated. An alloy-based powder (e.g., Fe—Cr—B—V-based powder) is applied and sintered onto the metal foam to form a alloy layer, e.g., an Fe—Cr—B—V-based alloy layer.

In a further embodiment, the sintering step for forming the alloy layer can be performed under hydrogen ($H_2$) atmosphere for 30 to 45 minutes, starting from 1200° C., at a heating rate of 15° C./min. The binder can be removed during the sintering process.

In a preferred embodiment where the alloy-based powder is Fe—Cr—B—V-based alloy powder, the powder comprises 50 to 70 wt % of iron (Fe), 25 to 40 wt % of chromium (Cr), 2 to 5 wt % of boron (B) and 4 to 8 wt % of vanadium (V), and the Fe—Cr—B—V-based powder has an average diameter of 20 to 50 μm.

If the contents of the alloying elements in the Fe-based powder are lower than the aforesaid range, superior corrosion resistance may not be attained. Otherwise, if they are higher than the aforesaid range, mass producibility becomes difficult due to increased costs. And, in the case of Fe—Cr—B—V-based powder, if the powder has an average diameter smaller than the aforesaid range, the powder price increases, thereby increasing overall production costs. Otherwise, if the average diameter is larger than the aforesaid range, the powder may interfere with fluid flow by blocking the pores of the metal foam.

In certain embodiments, the method of the invention next involves forming a nitride layer of a (Cr—V—B)N-based material onto the surface of the alloy layer while supplying nitrogen gas, i.e., in the presence of nitrogen gas. The nitrogen gas is supplied when necking occurs between the metal foam and the alloy-based powder (e.g., Fe—Cr—B—V-based powder) during the sintering step in order to prevent formation of a passivating oxide film on the alloy layer and at the same time to form a uniform nitride layer on the surface of the alloy layer.

The nitriding is performed under nitrogen ($N_2$) atmosphere for 30 minutes, at 500° C. to 600° C.

The nitride layer that is formed on the alloy layer surface suppresses the formation of a chromium oxide layer on the surface. As a result, contact resistance decreases to 20% or lower as compared to common stainless steel, thereby meeting the requisite level of low contact resistance of a separator of a fuel cell.

In certain embodiments, the nitride layer comprises a CrN layer and a (B—V)N layer physically mixed with the CrN layer, with at least part of or majority of the (B—V)N layer being exposed on the surface. The CrN layer has low contact resistance and maintains a uniform phase on the surface to provide good corrosion resistance.

The CrN layer can comprise 60 to 80 wt % of CrN and 20 to 40 wt % of $Cr_2N$ and has a thickness of 1 to 1.5 μm.

Generally, if the CrN layer comprises CrN only, it has good contact resistance with a gas diffusion layer (GDL) of the fuel cell stack, but contact resistance between two separators increases. Further, if the CrN layer comprises $Cr_2N$ only, the contact resistance between two separators is generally good, but the contact resistance with the GDL typically increases to some extent. A preferred embodiment is where the CrN layer comprises both CrN and $Cr_2N$, which advantageously provides good corrosion resistance.

The (B—V)N layer can comprise boron (B) doped in vanadium nitride (VN) and can be distributed uniformly in the CrN layer.

The VN generally reduces contact resistance because it has superior electrical conductivity. In an embodiment, VN is formed by supplying $N_2$ gas during the sintering. Because of excellent stability, the nitride is formed easily even when there exist oxides such as $Cr_2O_3$.

The metal foam can be made of iron and can have a porosity of 80 to 93%, a pore diameter of 50 to 450 μm and a thickness of 0.2 to 0.4 mm.

Next, in certain embodiments, the surface treatment method of the invention is completed by cutting and washing the metal separator resulting from the overall surface treatment process.

Through such a surface treatment process, a metal separator for a fuel cell having a surface structure comprising a Fe-based alloy layer and a nitride layer formed on the surface of the alloy layer is provided. In a preferred embodiment, the Fe-based alloy layer comprises Fe—Cr—B—V-based alloy and the nitride layer comprises a (Cr—V—B)N-based nitride layer.

EXAMPLES

The examples and experiments will now be described. The following examples and experiments are for illustrative purposes only and not intended to limit the scope of this disclosure.

Example and Test Example

A surface-treated metal separator sample was prepared by forming an alloy layer and a nitride layer on an iron metal foam according to the present invention. Then, corrosion rate and contact resistance of the metal separator were tested.

Figure 3A:
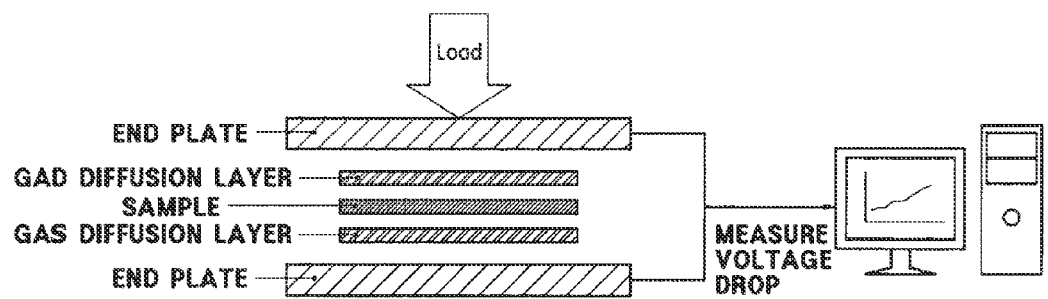
FIG. 3a and FIG. 3b schematically illustrate a method for evaluating the performance of a metal separator for a fuel cell according to an embodiment of the present disclosure.
Figure 3B:
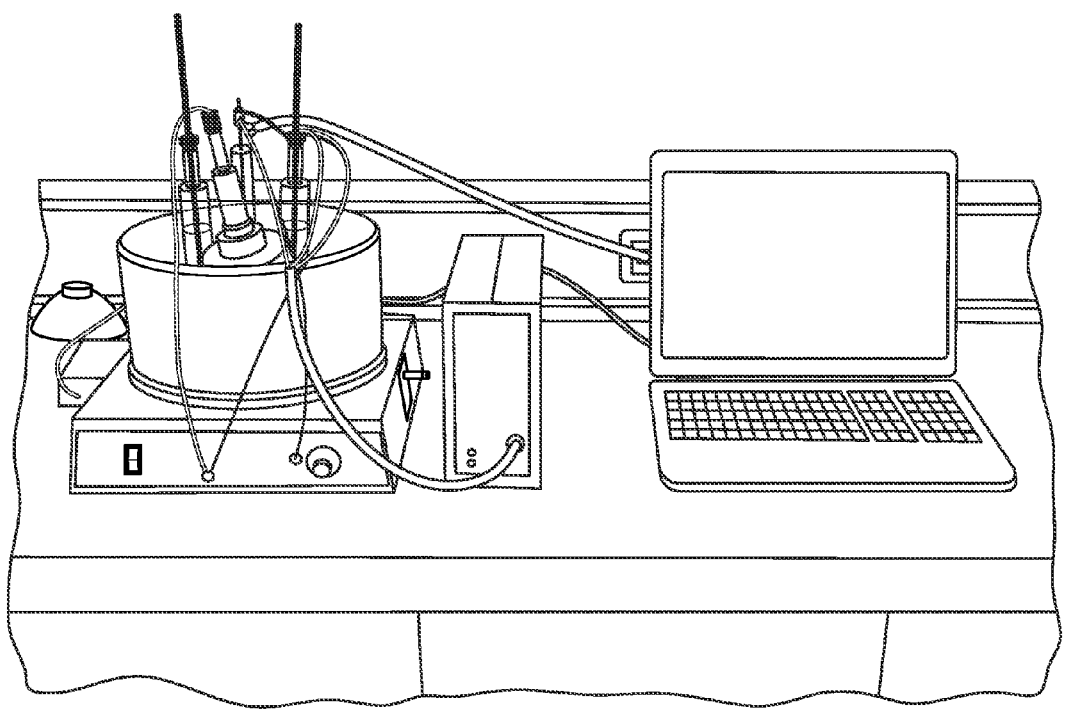
Figure 4:
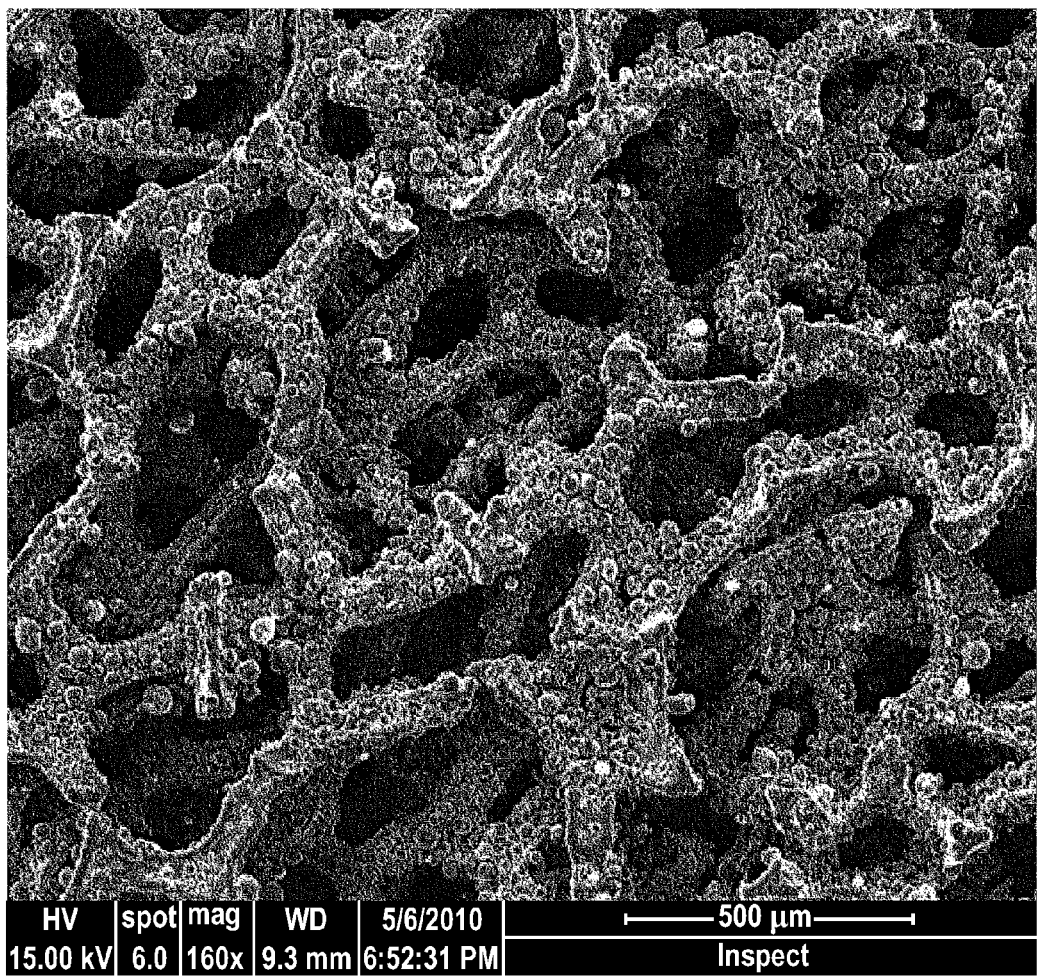
FIG. 4 shows an electron micrograph of a surface structure of a metal separator for a fuel cell according to an embodiment of the present invention.

As shown in FIG. 3a, after placing the sample between two gas diffusion layers located between two sheets of end plates, voltage drop was measured while applying a load of 150 psi.

As a measure of the initial property of a fuel cell, specific contact resistance was calculated by measuring voltage drop between the metal separator sample and carbon paper (gas diffusion layer) under a load of 150 psi.

As a measure of the long-term durability of a fuel cell, corrosion property was tested by comparing current density at 0.6 V, i.e. the voltage at which a fuel cell is operated, at 80° C. with respect to a reference electrode, after carrying out linear sweep voltammetry test using a three-electrode cell. 0.1 $NH_2SO_4$ (pH 1)+2 ppm HF was used as electrolyte solution.

A desired fuel cell performance is: contact resistance≤25 mΩ·cm$^2$ and corrosion current density≤1 μA/cm$^2$, which correspond to about 5,000 hours of endurance.

The test sample satisfied the desired performance, with a contact resistance of about 10 mΩ·cm$^2$ and a corrosion current density less than 1 μA/cm$^2$.

In contrast, the metal separator sample using stainless steel showed a contact resistance of about 80 mΩ·cm$^2$ and a corrosion current density of about 10 μA/cm$^2$. Thus, it can be seen that the present disclosure provides remarkable improvement in performance.

Figure 5:
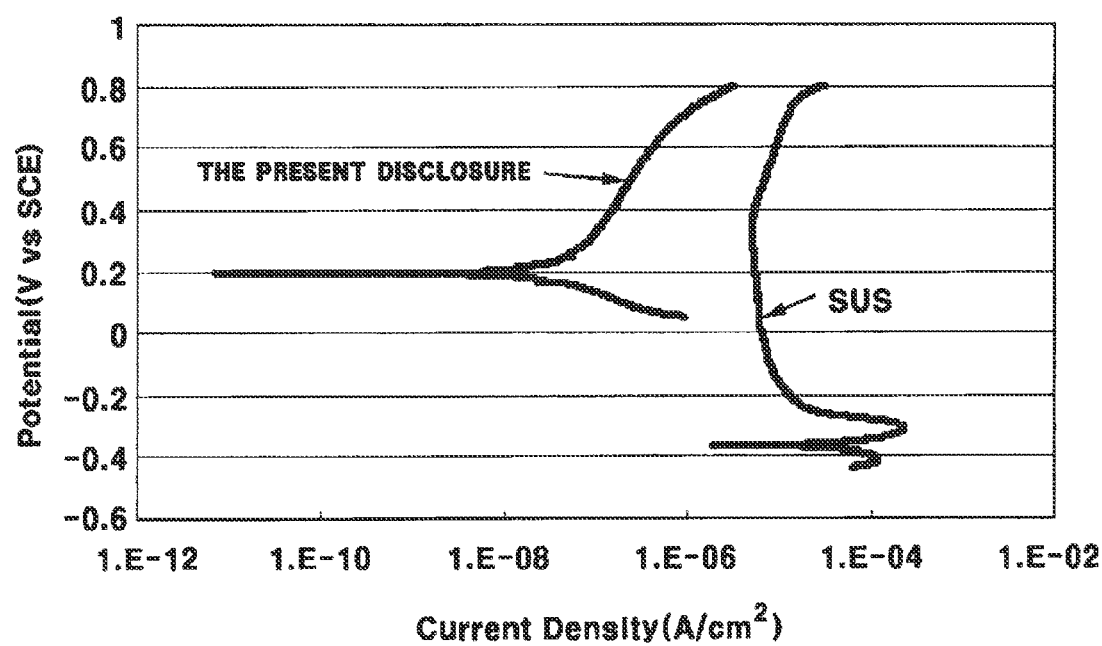
FIG. 5 compares polarization curves of a metal separator for a fuel cell according to an embodiment of the present disclosure and SUS316L.

The test result is shown in FIG. 5 and Table 1.

TABLE 1

| Sample | SUS316L | The present disclosure |
|---|---|---|
| Current density (μA/cm$^2$ @ 0.6 $V_{SCE}$) | 9.2 | 0.42 |
| Contact resistance (mΩ · cm$^2$ @ 150 psi) | 80 | 12.2 |

As described, in accordance with the present invention, in order to improve corrosion resistance and decrease contact resistance of a metal separator for a fuel cell, Fe—Cr—B—V-based powder is alloyed on an inexpensive Fe metal foam by powder sintering and then a nitride layer of (Cr—V—B)N is formed thereon, with the formation of a passivating oxide film minimized, by supplying $N_2$ gas when necking occurs between the metal foam and the Fe—Cr—B—V-based powder during the sintering. This provides improved corrosion property as well as contact resistance satisfying the requirement of a separator of a fuel cell. Further, it is applicable to mass production since it requires no modification of the existing sintering furnace and no additional processing or coating process. It allows more than 60% of cost reduction as compared to the existing coated stainless steel.

Further, the method of the invention is applicable to metal separators having any shape or thickness. With satisfactory corrosion resistance and contact resistance, the alloy powder used in the present disclosure allows improvement of the output of the fuel cell system. Further, product quality is ensured because defects formed during the coating process are minimized or eliminated.

That is to say, cost competitiveness is ensured since it is possible to form the alloy layer without additional coating processes and the desired performance of a separator of a fuel cell can be attained while minimizing the limitation resulting from the use of alloy since further processing is unnecessary.

The present disclosure has been described in detail with reference to specific embodiments thereof. However, it will be appreciated by those skilled in the art that various changes and modifications may be made in these embodiments without departing from the principles and spirit of the disclosure, the scope of which is defined in the appended claims and their equivalents.

What is claimed is:

1. A method for treating a surface of a metal separator for a fuel cell, comprising: sintering an Fe—Cr—B—V-based powder on the surface of a metal foam to form an alloy layer; and forming a nitride layer of a (Cr—V—B)N-based material while supplying nitrogen gas on the surface of the alloy layer.

2. The method according to claim 1, wherein the nitrogen gas is supplied when necking occurs between the metal foam and the Fe—Cr—B—V-based powder during said sintering in order to form a uniform nitride layer on the surface of the alloy layer.

3. The method according to claim 1, wherein the Fe—Cr—B—V-based powder is an alloy powder comprising 50 to 70 wt % of iron (Fe), 25 to 40 wt % of chromium (Cr), 2 to 5 wt % of boron (B) and 4 to 8 wt % of vanadium (V).

4. The method according to claim 1, wherein the Fe—Cr—B—V-based powder has an average diameter of 20 to 50 μm.

5. The method according to claim 1, wherein the nitride layer comprises a CrN layer and a (B—V)N layer physically mixed with the CrN layer, with at least part of the (B—V)N layer being exposed on the surface, and wherein the CrN layer comprising 60 to 80 wt % of CrN and 20 to 40 wt % of Cr2N and having a thickness of 1 to 1.5 μm.

6. The method claim 5, wherein the (B—V)N layer comprises boron (B) doped in vanadium nitride (VN).

7. The method according to claim 1, wherein the metal foam is made of iron and has a porosity of 80 to 93%, a pore diameter of 50 to 450 um and a thickness of 0.2 to 0.4 mm.

* * * * *